Figure 7:
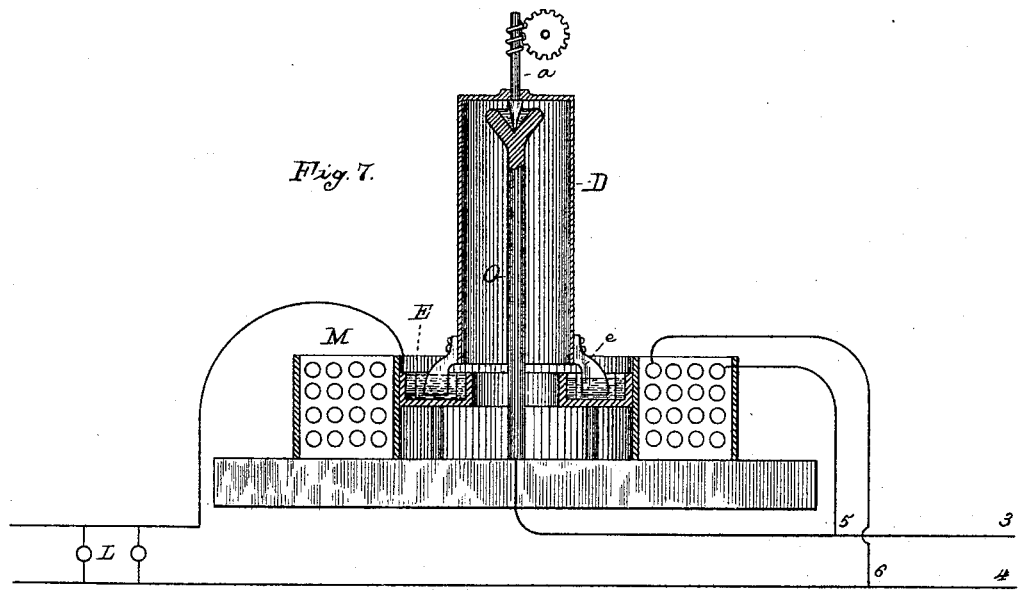

(No Model.)  
2 Sheets—Sheet 1.
T. A. EDISON.
ELECTRIC METER.
No. 370,123.  Patented Sept. 20, 1887.
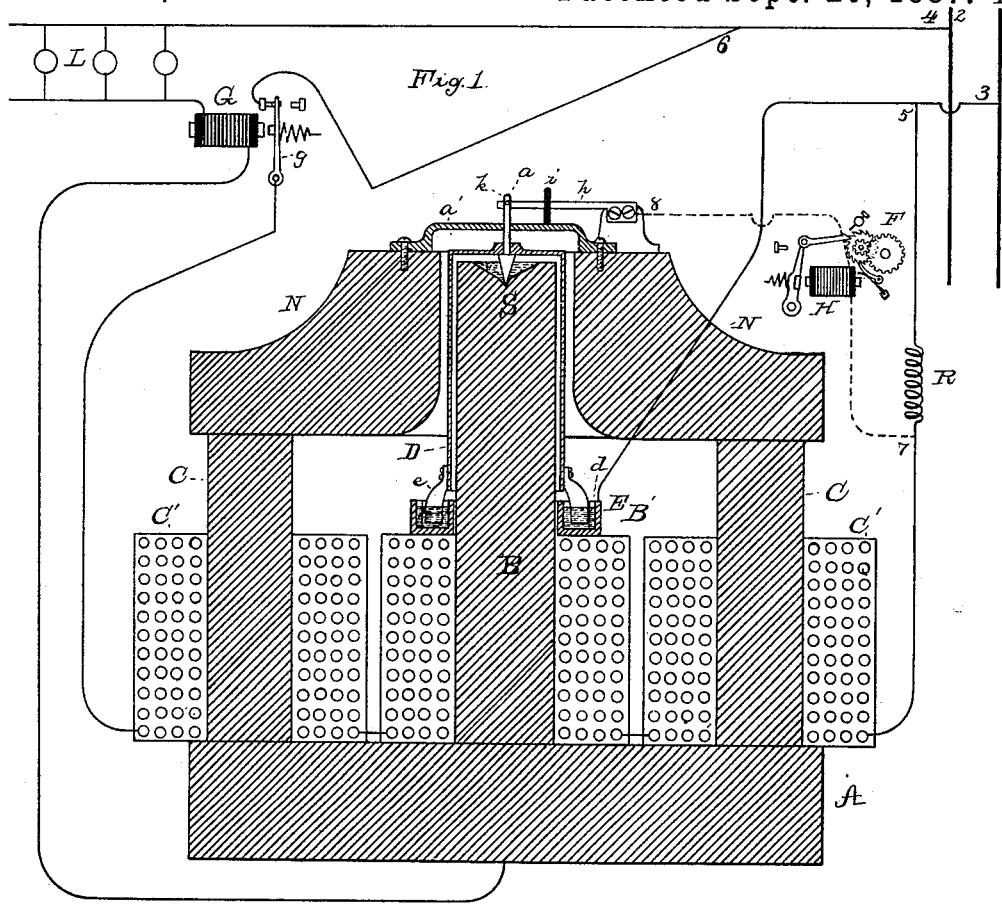
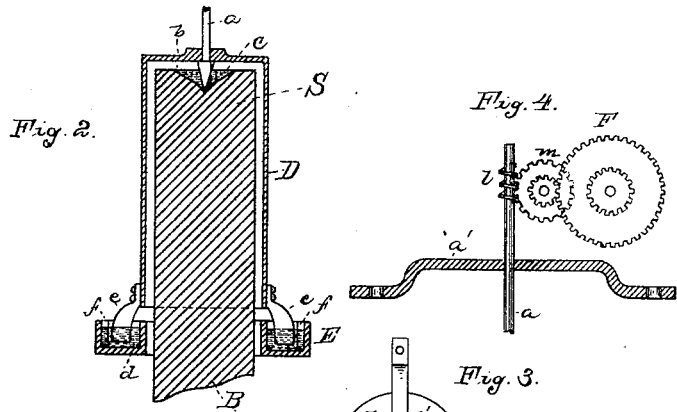
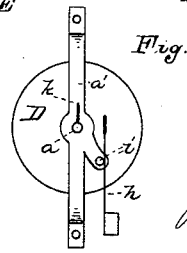
ATTEST:  
E. C. Rowland  
H. W. Seely
INVENTOR:  
Thomas A. Edison,  
By Rich'd N. Dyer,  
Atty.

(No Model.)

T. A. EDISON.
ELECTRIC METER.

No. 370,123.  Patented Sept. 20, 1887.

ATTEST:
E. C. Rowland
H. W. Seely

INVENTOR:
Thomas A. Edison,
By Rich'd N. Dyer,
Atty.

United States Patent Office.

THOMAS A. EDISON, OF MENLO PARK, NEW JERSEY.

ELECTRIC METER.

SPECIFICATION forming part of Letters Patent No. 370,123, dated September 20, 1887.

Application filed April 17, 1883. Serial No. 91,956. (No model.) Patented in England May 30, 1883, No. 2,675.

*To all whom it may concern:*

Be it known that I, THOMAS A. EDISON, of Menlo Park, in the county of Middlesex and State of New Jersey, have invented a new and useful Improvement in Electrical Meters, (Case No. 559,) of which the following is a specification.

The object I have in view is to produce a cheap and reliable meter for measuring automatically the electric current or energy consumed in a system for the general distribution of electricity for light, heat, and power, and this I accomplish by the use, in connection with the translation-circuit of which the current is to be measured, of a peculiarly-constructed electro-dynamic motor, and providing a proper indicating, registering, or counting mechanism controlled or operated by such motor, and also providing such peculiar motor with devices for causing the motor to perform a definite amount of work in order to reduce to the minimum the importance of the indefinite or variable friction as a factor in the work of the motor.

In my Patent No. 242,901 there is described a meter composed of an electro-dynamic motor arranged in the translation-circuit and having a definite loading and operating, indicating, or registering apparatus; but such motor is shown as a machine provided with a commutator, which machines, when used as the operative or controlling elements of electrical meters, are subject to the objection that the multiple contacts of the commutator cannot be made without considerable indefinite or variable friction, which increases the liability to error in registering, the wear upon the parts is great, and there is difficulty experienced in attaining sufficiently-low resistance. These objections and difficulties I overcome by the use of the peculiar electro-dynamic motor, which is a non-commutator or uni-polar machine of such character that I apply to it the term "mono-electro-dynamic motor," its inductive or rotating part being a straight or one-part conductor, the current passing through it in one direction only.

The peculiar construction of this motor and the connections and accompanying parts used with it to form a meter will be fully hereinafter explained.

By the use of the mono-electro-dynamic motor I am enabled to convey powerful currents through the apparatus without loss by the resistance at solid metallic or multiple contacts, and also to obtain slow movement or rotations with powerful currents, and at the same time to attain these results with exceedingly small, indefinite, or variable friction.

Figures 5, 6:
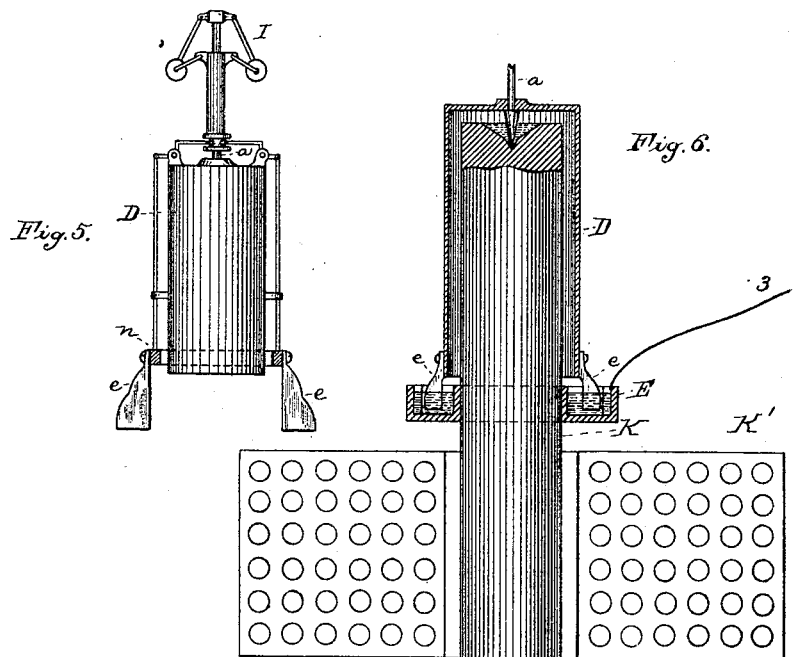

In the accompanying drawings, forming a part hereof, Figure 1 is a sectional elevation of the mono-electro-dynamic motor used as a meter with an elevation of an indicating or registering mechanism and a diagram of connections; Fig. 2, a separate sectional view of the revolving cylinder forming the single or straight non-magnetic inductive portion of the machine, and of the magnetic core upon which said cylinder revolves; Fig. 3, a top view of the revolving cylinder, showing means for completing the circuit of the registering mechanism; Fig. 4, an elevation of a modification showing the registering mechanism operated directly by the revolving cylinder; Fig. 5, an elevation of the cylinder, showing means for varying the loading of the motor to compensate for variations in proportionate friction; Fig. 6, a vertical section of a modification wherein the magnetic core revolves and the non-magnetic cylinder remains stationary, and Fig. 7 a vertical section of a modified form of the motor wherein no magnetic parts are used.

The mono-electro-dynamic motor is composed of an iron base, A, which forms the back of the field electro-magnet of the machine, one pole of which is the upper end, S, of the central core, B, while the other pole is formed by the ring or a number of separate pole-pieces, N, supported on cores C, rising from A and surrounding the pole S. The cores B C are provided with wire bobbins B' C'. In the magnetic field, between S and N, is located the revolving one-part or straight inductive portion of the machine. This is preferably a cylinder, D, which may be of copper, and which is supported upon S by a central pivoting spindle, $a$, resting in a depression, $b$, in the top of S. This spindle passes through a guiding-yoke, $a'$, and through the center of the closed upper end of the cylinder, and is secured rigidly thereto. It is pointed, and is constructed of platinum or platinum-iridium alloy, so as not to amalgamate with the mercury, c, with which the depression b is partly filled. The revolving pivot or spindle is located in the circuit, as will be presently explained, and the mercury is used to make good and sufficient contact in order to carry a powerful current without heating.

The lower end of the cylinder D is provided with means for maintaining contact with the mercury, d, in a circular trough, E. This means is preferably in the form of fans or paddles e, which dip into the mercury, and, while maintaining the circuit complete, act to retard the movement of the motor, giving it a definite loading or a definite amount of work to perform. The mercury-trough E may be provided with stationary blades f, to prevent the rotation of the mercury in a body. Current being passed through the bobbins B' C' and through the cylinder D, such cylinder will revolve, the speed being directly proportionate to the current, and this motion may be used to advantage to operate or control suitable indicating or registering mechanism, F, for measuring the electrical current or energy consumed in a circuit.

In Fig. 1 the connections are shown for the use of the peculiar motor as a meter in my multiple-arc system of electrical distribution. 1 2 are the street-mains, and 3 4 a house-circuit therefrom, having connected therewith in multiple arc, lamps or other translating devices L. In the house-circuit, between the street-mains and the translating devices, the line 3 is broken and is carried to the mercury-trough E, from whence the current passes through the mercury, d, to paddles e and up the one-part or straight inductive portions of the machine formed by cylinder D to spindle a, and then through this spindle and the mercury, c, to core B. The current passes down core B to base A, with which the other side of line 3 is connected. The motor is thus brought directly into the translation-circuit and all the current supplied to the translating devices passes through it; but it is evident that the same result would be produced if the motor were located in a shunt around a definite resistance in line 3. The translating devices being in multiple arc, variations in the number of such devices produce direct variations in the current or energy consumed in the circuit and in the speed of the motor.

The field-coils of the motor are in a multiple-arc circuit, 5 6, from 3 4, all the bobbins B' C' being located in such circuit, and an additional resistance, R, being also preferably employed. The location of the field-magnet in a separate multiple-arc circuit makes the field a constant one, while all the variations are produced in the revolving one-part or straight inductive portion of the machine.

A permanent steel magnet can be used to produce the constant field; but I prefer to use the electro-magnet, as already described.

To prevent loss of energy by a flow of current through the field-circuit 5 6 when there is no translating device in circuit, I provide means for opening the circuit 5 6 when there is no translating device in circuit and for closing such circuit when a single translating device is placed in circuit. For this purpose an electro-magnet, G, is located in line 3, or in a shunt therefrom, between the translating devices and the street-mains, and controls a lever, g, in circuit 5 6, and closing circuit 5 6 at its front contact when a single translating device is in circuit, and opening such circuit at its back contact when the last translating device is removed from circuit.

The indicating or registering mechanism F may be operated by an electro-magnet, H, which is placed in circuit 7 8 between the wire 5 on one side of resistance R to a spring, h, mounted on an insulating-block on N and springing toward the spindle a of the revolving cylinder. This spring is prevented from striking the spindle by an insulated pin, i, on yoke a'; but once in every revolution of the cylinder it is struck by a metal pin, k, on the spindle a, closing circuit through the magnet H and giving one impulse to the indicating or registering apparatus. In this way the indicating or registering apparatus will indicate or register the revolutions of the cylinder. The indicating or registering apparatus may, however, be operated directly by the cylinder through suitable gearing, as shown in Fig. 4, the spindle a being provided with a worm, l, meshing with a worm-wheel, m, forming part of the indicator or register.

In order that the rotating shell may so perform its work that the speed of rotation will be directly proportionate to the current, the paddles upon the cylinder must be correctly proportioned and arranged in a proper manner.

Since the meter may be made of quite large size, and when so made will have a large initial friction, it is preferred for large-sized meters to make the cylinder-paddles loose and provide means for varying their dip in the mercury in proportion to the speed, in order to make the speed of rotation of the cylinder directly proportionate to the current. Such a construction is shown in Fig. 5, wherein the paddles e are mounted on a ring, n, connected with a centrifugal governor, I, mounted on the spindle a.

It is not essential that the shell D should revolve, since it may be held stationary and the magnetic core be arranged for revolution, as shown in Fig. 6. In that figure the shell D is held stationary in a suitable frame, (not shown,) while the core K revolves. This core may be a permanent magnet or be made of iron magnetized by bobbin K', which may be stationary or be carried by the core. The mercury-trough E is carried by and revolves with the core, although it can be stationary and the core be provided with paddles dipping into the mercury. The core K is mounted on a spindle, p, turning in mercury, and may operate the indicator or register directly, as shown, or by closing at intervals a local circuit. The cylinder D and core K will be located in the line 3 of the translation-circuit, while the bobbin K' will be in a multiple-arc circuit from the translation-circuit. It is also not essential to have a field-magnet, since the cylinder will rotate if a helix, M, alone be used, as shown in Fig. 7; but by the use of iron less current is required to perform the work.

In Fig. 7 the cylinder D revolves upon a non-magnetic support, O, such support and the cylinder being located directly in the translation-circuit, while the helix M is in a multiple-arc circuit therefrom.

What I claim is—

1. In an electrical meter, the combination, with indicating or registering apparatus, of an electro-dynamic motor operating such indicating or registering apparatus and having its inductive portion in the translation-circuit, the electrical energy consumed in which is to be measured, and a multiple-arc circuit including the field-coils of such motor, substantially as set forth.

2. A mono-electro-dynamic motor, in combination with means for giving such motor a definite loading, and means for varying such load, to compensate for variations in proportionate friction, substantially as set forth.

3. In an electrical meter, the combination, with indicating or registering apparatus, of an electro-dynamic motor located in the translation-circuit, a multiple-arc circuit including the field-of-force coils of such motor, and means located in the translation-circuit for opening and closing such field-circuit when the last translating device is removed from circuit and the first one placed in circuit, substantially as set forth.

4. In an electrical meter, a non-commutator electro-dynamic motor provided with a single or straight inductive portion, and having the opposite poles of its field-magnet brought together on opposite sides of such inductive portion, in combination with a register operated or controlled by the motor, substantially as set forth.

5. In a mono-electro-dynamic motor forming the operative part of an electrical meter, the revolving cylinder forming the inductive portion of the motor, in combination with a register operated or controlled by the motor, substantially as set forth.

6. In a mono-electro-dynamic motor forming the operative part of an electrical meter, the combination, with a centrally-located pole and a surrounding pole, of a revolving cylinder mounted upon the centrally-located pole, and a register operated or controlled by the motor, substantially as set forth.

This specification signed and witnessed this 6th day of April, 1883.

THOS. A. EDISON.

Witnesses:
H. W. SEELY,
EDWARD H. PYATT.